March 10, 1931. A. A. GOLOVTCHIKOFF 1,795,771
INCINERATOR
Filed Feb. 4, 1925 8 Sheets-Sheet 1

Alexander A. Golovtchikoff INVENTOR

BY
ATTORNEYS.

March 10, 1931.  A. A. GOLOVTCHIKOFF  1,795,771
INCINERATOR
Filed Feb. 4, 1925   8 Sheets-Sheet 2

Alexander A. Golovtchikoff INVENTOR

BY Mock & Blum
ATTORNEYS.

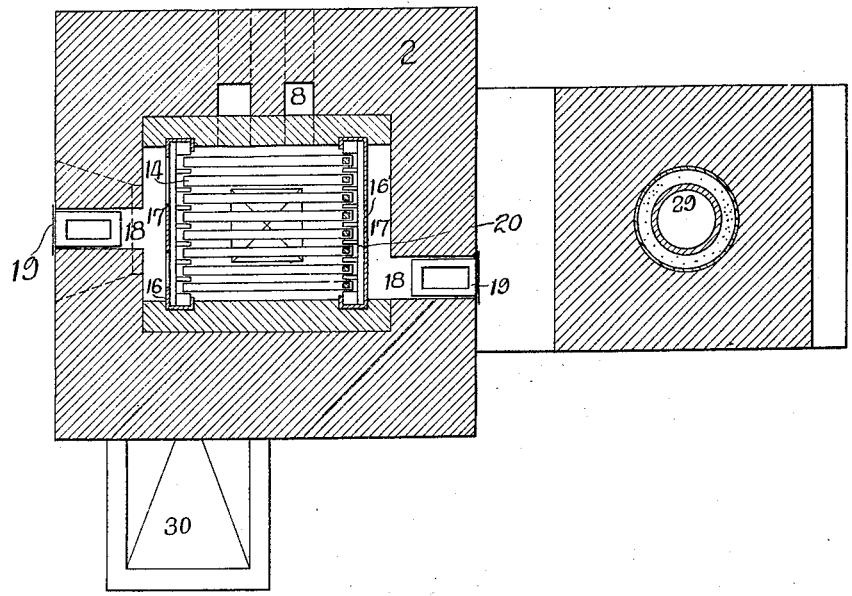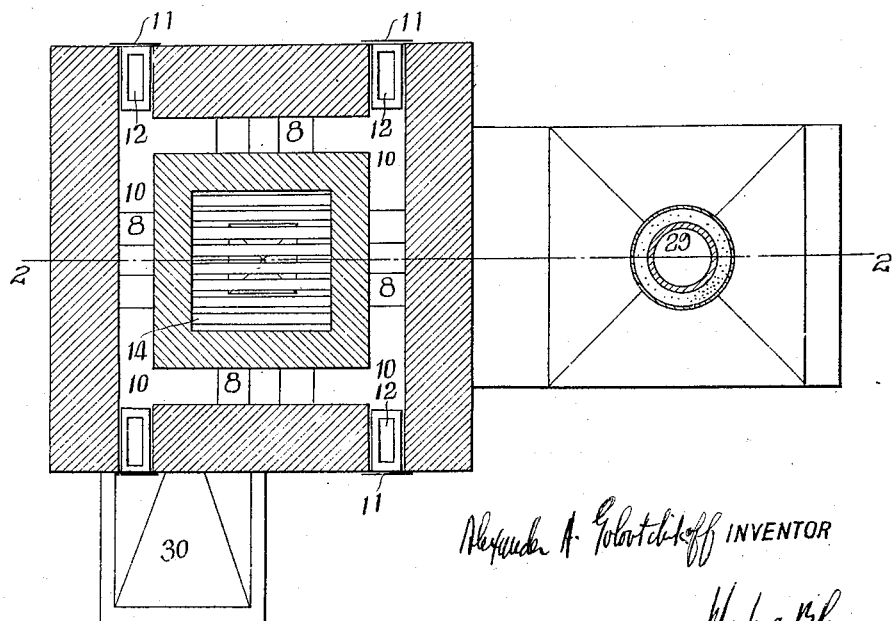

March 10, 1931.  A. A. GOLOVTCHIKOFF  1,795,771
INCINERATOR
Filed Feb. 4, 1925  8 Sheets-Sheet 4

INVENTOR
Alexander A. Golovtchikoff
BY Mock & Blum
ATTORNEYS.

March 10, 1931.  A. A. GOLOVTCHIKOFF  1,795,771
INCINERATOR
Filed Feb. 4, 1925  8 Sheets-Sheet 5

INVENTOR
Alexander A. Golovtchikoff
BY Mock & Blum
ATTORNEYS.

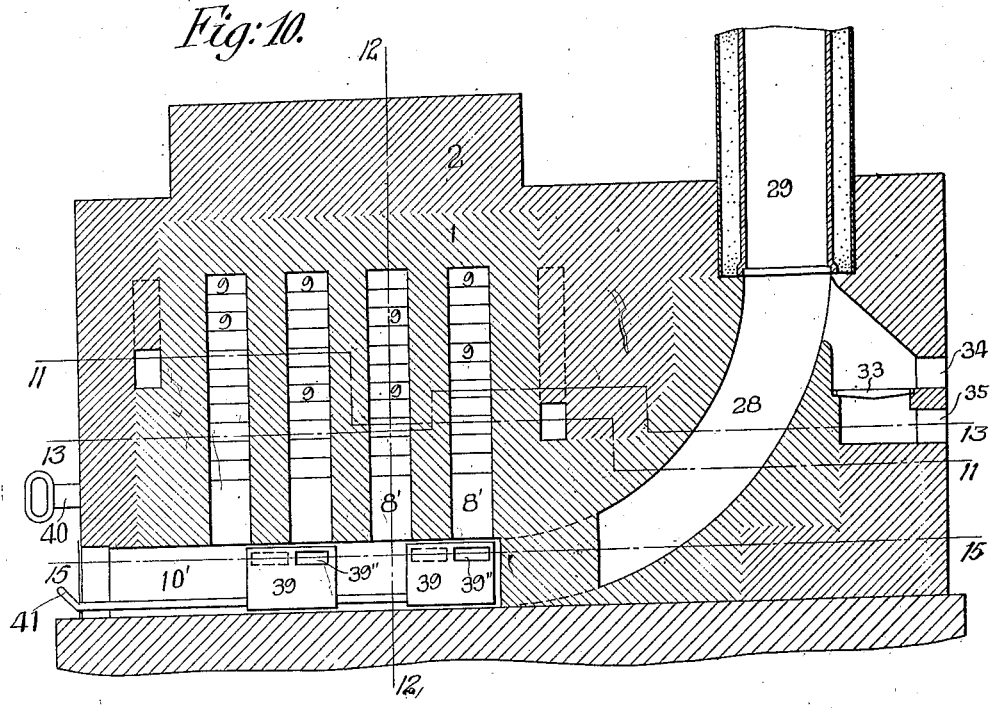
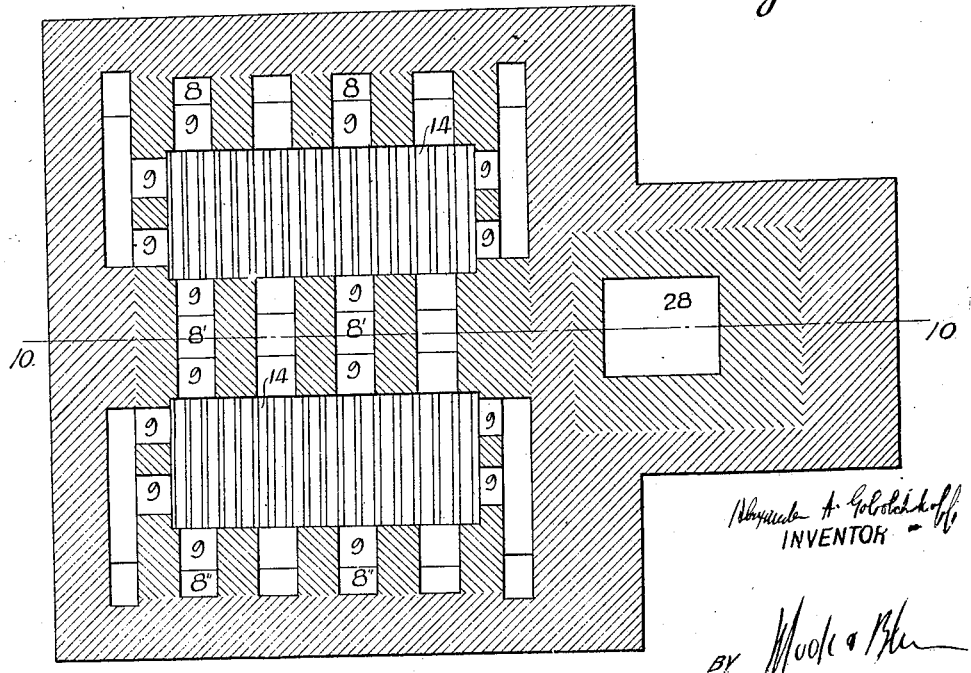

March 10, 1931. A. A. GOLOVTCHIKOFF 1,795,771
INCINERATOR
Filed Feb. 4, 1925 8 Sheets-Sheet 7

INVENTOR
ATTORNEYS.

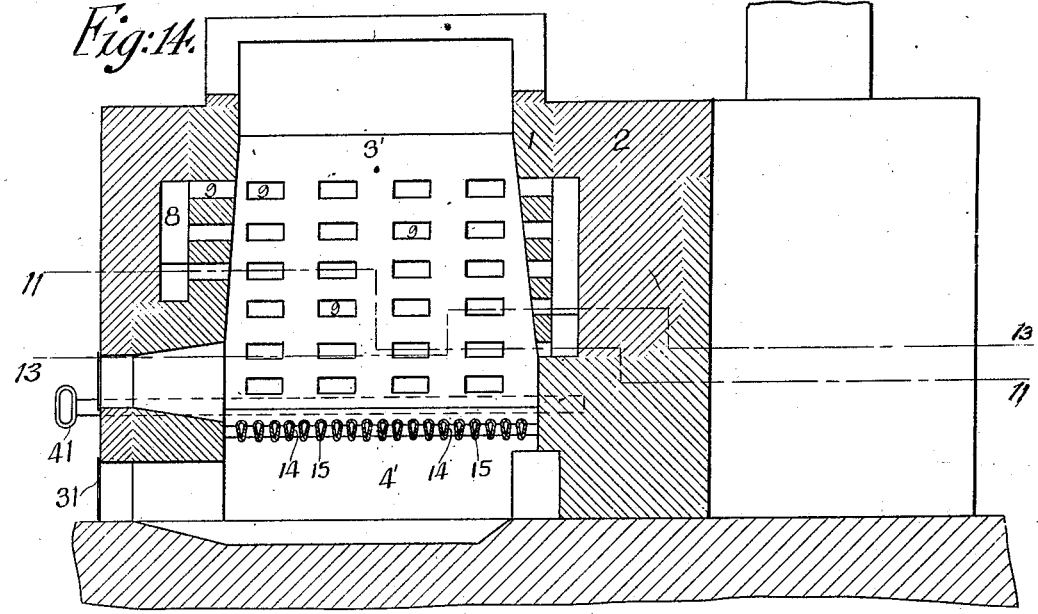
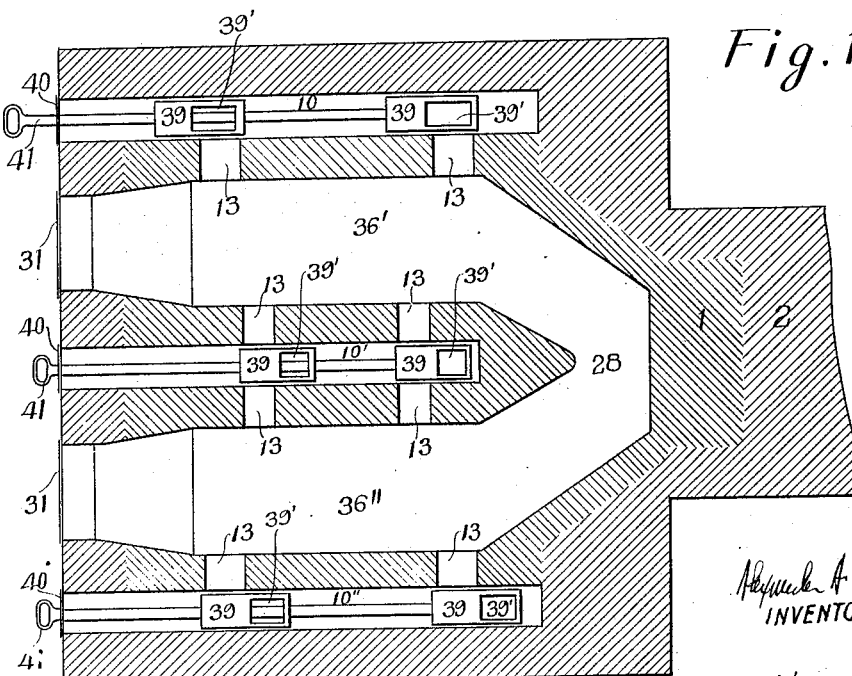

Patented Mar. 10, 1931

1,795,771

UNITED STATES PATENT OFFICE

ALEXANDER ALEXANDROVITCH GOLOVTCHIKOFF, OF TOKYO-FU-KA, JAPAN, ASSIGNOR OF ONE-HALF TO SHUN ICHI ONO, OF TOKYO, JAPAN

INCINERATOR

Application filed February 4, 1925. Serial No. 6,844.

This invention relates to an incinerator for burning solid waste (garbage, carcasses or the like) and evaporating and burning liquid waste (excrement or the like) without any smoke, or smell owing to suitable decomposition of the organic matter by high temperatures. The apparatus is provided with an upper preliminary combustion chamber and a lower complete combustion chamber separated from each other by a fire-grate consisting of several hollow fire-bars, the furnace being of the down draft type. Said preliminary combustion chamber is surrounded by a number of vertical and horizontal air-chambers or air passages which are situated within the wall and these air passages connect the lower, or complete, combustion chamber with the exterior atmosphere by means of many horizontal air passages, so that the external air is sucked into each said air-chamber, passing through a control valve which is inserted into the exterior opening of each horizontal passage.

An air passage of this type serves as a pre-heater of the air which enters into the combustion chamber. The lower, or complete combustion chamber has an inner wall which is of pyramidal form, its sectional area being increased gradually downwards so that there are always free spaces between the supplied solid waste and the inclined inner surface of the wall. The air is introduced easily into the preliminary combustion chamber through said openings. When the solid waste is burnt in the preliminary combustion chamber, the gases produced by incomplete combustion pass into the lower combustion chamber, penetrating through the entire layer of solid waste. Said gases also pass through the spaces of the fire-grate on which the solid waste is located and said gases also pass through the lower horizontal passages which connect the air chamber and the lower combustion chamber. This downward movement of the gases is produced by means of the down draft which is produced previously by combustion on a rear grate. The complete combustion then takes place in the lower or complete combustion chamber. For this purpose the atmospheric air is always supplied in a pre-heated condition by passing it preliminarily through the hollow fire-bars of the grate as well as through the air-chambers within the wall, and its supply is regulated by a hand controlled valve at each outside opening of each air passage. The flame in the complete combustion chamber envelops and heats from every side the liquid waste which is poured into a cast iron box provided in a cavity located at the bottom of the lower or complete combustion chamber, thus evaporating and burning it without smoke and smell owing to suitable decomposition of its malodorous ingredients, such as ammonia, indol and scatol. The gases thus finally produced are eliminated in smokeless state from the chimney, without any unpleasant smell. It is clear that the waste heat of the high temperature gases issuing from the lower or complete combustion chamber may be utilized for many other purposes.

In this invention the inner part of the incinerator body is constructed with fire-proof brick or the like, insuring its durability, and the outer part is built of ordinary brick or the like. The aim of this invention is to provide incinerators for burning the solid and liquid wastes without excess of fuel for the sanitary improvement of private houses as well as hospitals, schools, factories, cities, etc.

The further object of this invention is to dry a large quantity of excrement for the production of potassium and to phosphate fertilizers.

In the accompanying drawings:

Figs. 1 to 7 show one type of the incinerator according to this invention, namely:

Fig. 1 is a perspective view showing the outline of the incinerator.

Fig. 2 is a longitudinal section on the line 2—2 of Fig. 3.

Fig. 3 is a horizontal section on the line 3—3 of Fig. 2.

Fig. 4 is the same on the line 4—4 of Fig. 2.

Fig. 5 is the same on the line 5—5 of Fig. 2.

Fig. 6 is the same on the line 6—6 of Fig. 2.

Fig. 7 is a vertical section on the line 7—7 of Fig. 2.

Fig. 8 is a longitudinal section.

Fig. 9 is a horizontal section on the line 9—9 of Fig. 8. Figs. 10 to 15 show a modification of the other type, wherein two incinerators are so combined that they are employed alternately and;

Fig. 10 is a longitudinal section on the line 10—10 of Fig. 11.

Fig. 11 is a horizontal section on the line 11—11 of Figs. 10 and 14.

Fig. 12 is a vertical section on the line 12—12 of Fig. 10.

Fig. 13 is a horizontal section on the line 13—13 of Figs. 10 and 14.

Fig. 14 is a vertical section on the line 14—14 of Fig. 13, and Fig. 15 is a horizontal section on the line 15—15 of Fig. 10.

Figure 1:
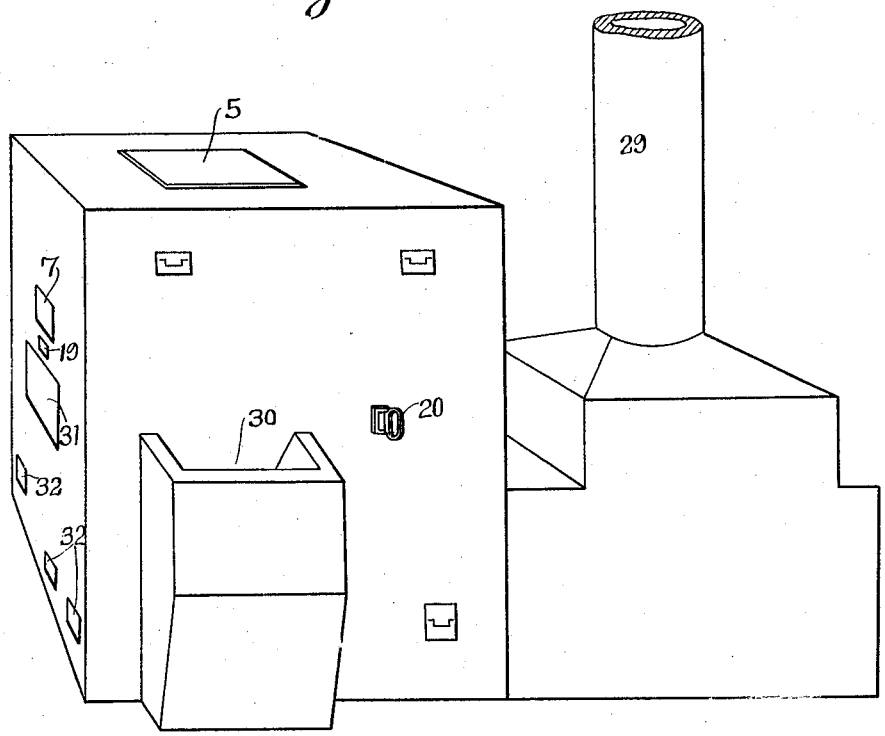
Figure 2:
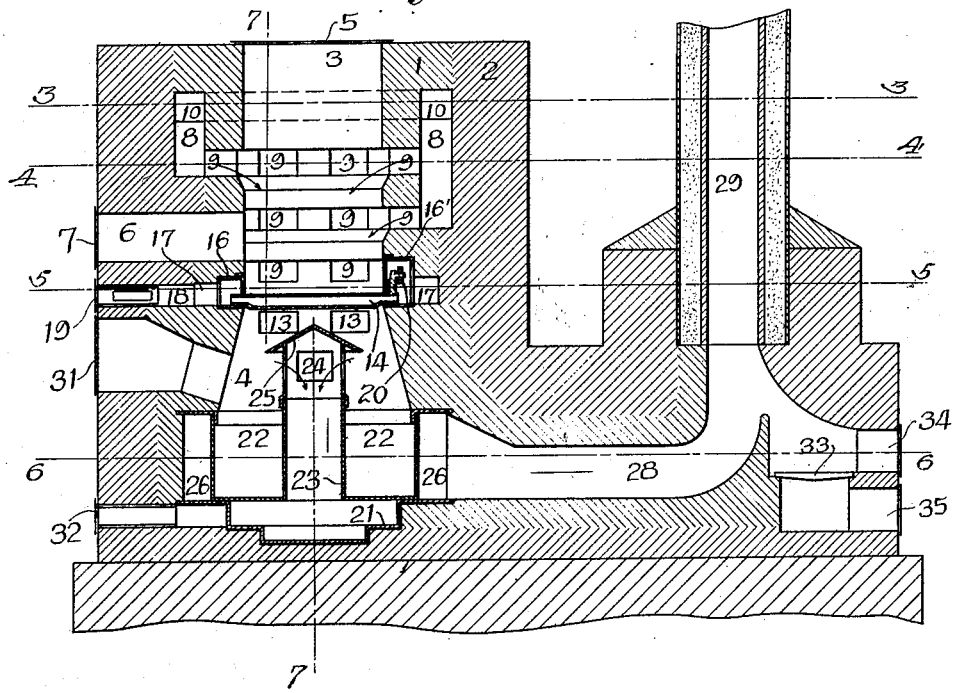
Figure 6:
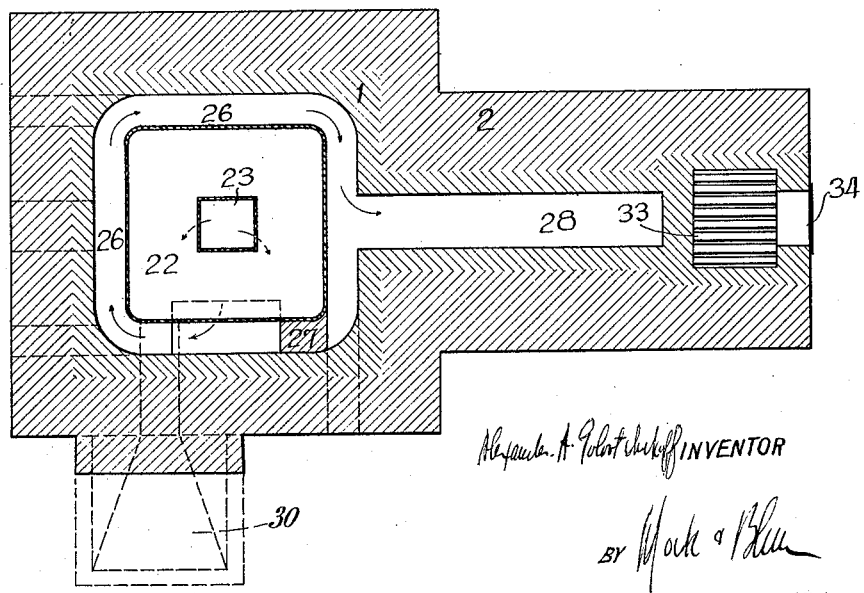
Figure 7:
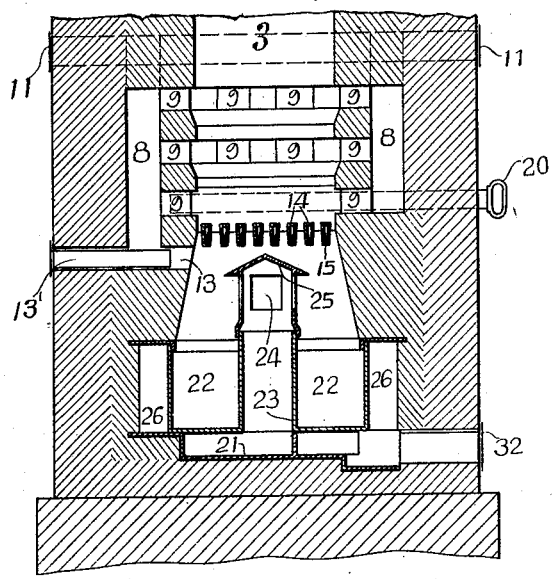
Figure 4:
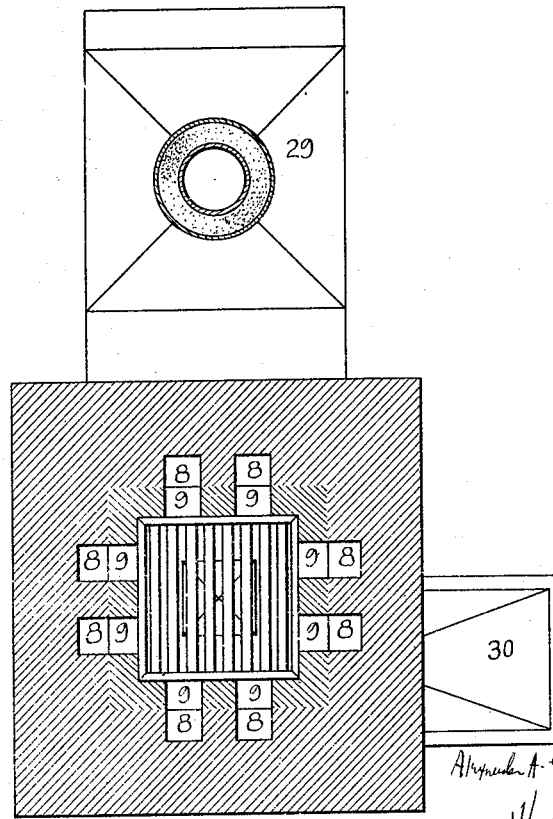

In the first type, as shown in Figs. 1 to 7, the incinerator is made of fire-proof brick or other similar material at its inner part 1, while its outer part 2 is made of ordinary brick. The inner volume of the incinerator is separated by a hollow fire grate fixed at its middle portion to form two combustion chambers 3 and 4. The upper or primary combustion chamber 3 is fed with garbage or other solid waste from the upper inlet which is provided with a cover 5, and at the lower part of the wall of said chamber 3 there is an opening 6 having a trap-door 7 through which firing operation will be performed. This chamber 3 is surrounded by several vertical air passages 8 in the wall and these air passages communicate with said chamber 3 through many passages 9, and said air passages are also connected to horizontal passages 10 which extend to the exterior of the furnace. The outer end of each passage 10 is provided with a box type control valve 11, each side wall of which has an aperture 12, the inner end being open. The intake of air is controlled by the relative position of said valve 11. At the connecting zone of each passage 9 and the chamber 3, the wall of the chamber has its inner surface inclined to form free spaces through which the air will be easily introduced. Each vertical passage 8 is also connected to the complete combustion chamber 4 under the grate by means of horizontal passages 13 which extends to the outside, each passage 13 having a control valve 13' of the closed box type. Each valve 13' is employed for controlling the passage of air by its relative position.

The fire-grate consists of a row of hollow fire bars 14 whose ends are located in the boxes 16 and 16' and the rear opening of each said box is connected to an aperture 17 parallel to said box, each aperture being connected to the exterior of the furnace through a horizontal passage 18.

Each passage 18 is also controlled by a valve 19 similar to valve 11 previously described.

Hence, fresh air is fed into the complete combustion chamber 4 in a preheated condition by being passed through the passages 18, fire bars 14 and small openings 15 in the bottom of each fire bar. Each fire bar 14 has a trunnion engaged in one of the openings of a flat bar 20 which is inserted into the box 16' so that it is possible to rock fire bars 14 to and fro by operating the handle of said bar 20. Likewise, fresh preheated air can be passed into the chamber 4 through openings 13.

In the enlarged part of the complete combustion chamber 4 under the fire grate, there is a cast iron box 22 for receiving liquid waste and said box 22 is located on a cast iron base 21. In the center of the box, there is a fire pipe 23 with a gable shaped lid 25 which protects the aperture of the pipe 23 from ashes or liquid waste which may fall into it. The pipe has openings 24 as fire inlets at its upper part and the lower opening is connected to the fire passage 26 through the space formed by said base 21. Owing to the cut-off wall 27, the flame passes from the pipe 23 to the fire passage 26 which surrounds the box 22, leading to the flue 28 and chamber 29 without any interruption.

At the side of the incinerator, a liquid-charging inlet 30 is located, and an ash pit with a door 32 and an opening 31 for the cleaning of flues is arranged at the front part.

A draft accelerating grate 33 is located under the chamber at the rear of the incinerator, and grate 33 has an ash pit 35, and the opening 34 through which the firing operation is performed.

An incinerator thus made according to this invention will be operated as follows:

At first doors or valves 5, 7, 11, 19 and 31 are all moved to the closed position and a small quantity of wood and coal is burnt on the grate 33 in order to start the down draft through the chambers 3, 4, through the flue 28 and then up the chimney 29. Then fire-wood and coal are charged on the grate 14 from upper opening 5 of the incinerator or through the opening 6. After the combustion chamber is warmed to some degree, the passages controlled by valves 11 and 19 are gradually opened for supplying fresh preheated air to accelerate the combustion, and garbage or the like is charged into the chamber 3 from the upper inlet 5 and liquid waste is introduced through 30 into the box 22. The passages controlled by valves 19 are also opened, as above described, to introduce fresh air into the chamber 4 into which combustion gases produced by incomplete combustion pass from the upper chamber 3 penetrating the layer of the garbage and passing through the spaces of the fire grate, and the complete combustion takes place in chamber 4.

The fact that the air is supplied in a preheated condition intensifies the combustion considerably. Besides the preheated air prevents the lowering of the temperature in the incinerator which may happen because of the influx of cold air, and it also dries the waste prior to burning.

In the course of the combustion the valves 13′ may be also controlled for leading the combustion gases from the chamber 3 to the lower chamber 4 through the vertical air-passages 8.

Flame enters the opening 24 of the pipe 23 and circulates through the bottom of the base 21, passage 26, flue 28 and to chimney 29, while the liquid waste is evaporated and odorous substances such as ammonia, indol, scatol, etc., are effectively decomposed into free nitrogen, $CO_2$ gas and hydrogen, etc., owing to the high temperature in these parts of the incinerator, and the gas is eliminated in a smokeless and odorless stage, containing only negligible ash.

Figure 9:
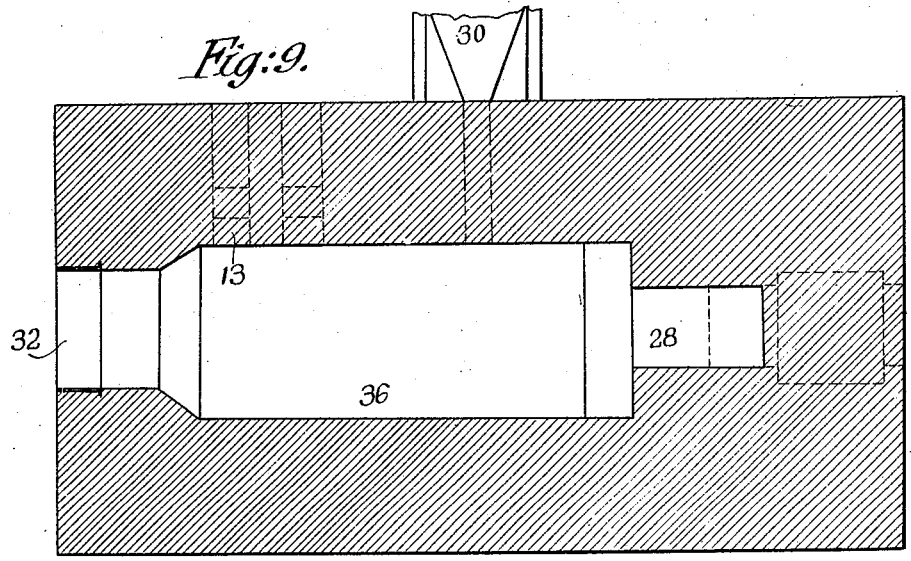
Figs. 8 and 9 show the other type of the incinerator according to this invention, wherein the bottom is provided with a cavity for the liquid waste.
Figure 8:
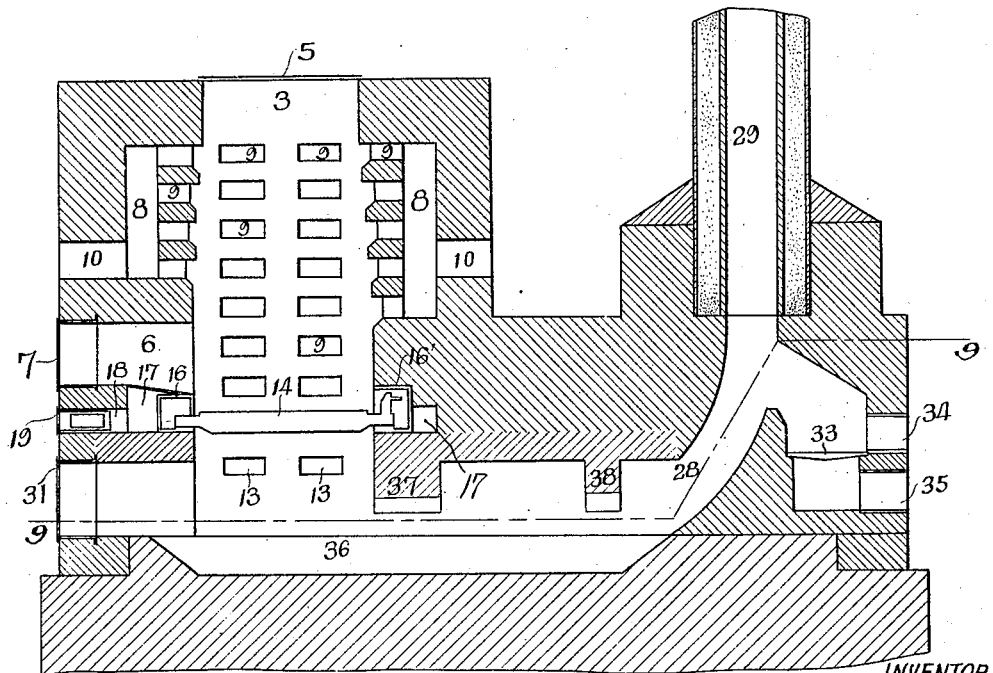
Figure 12:
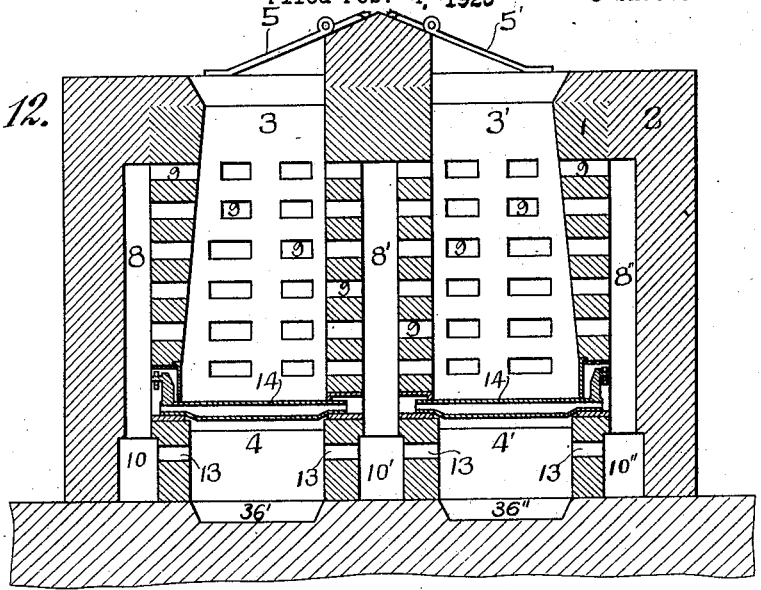
Figure 13:
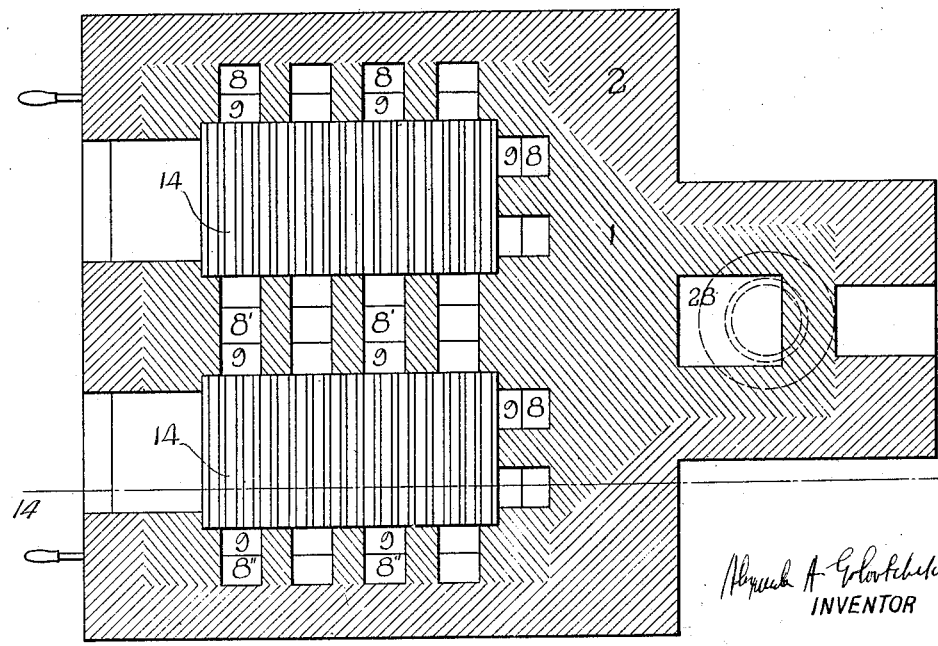

As shown in Figs. 8 and 9, the second type of the incinerator has the fire grate situated in a position lower than in the first type so that a larger volume of garbage or other solid waste can be burnt and there is a cavity 36 extending from the bottom of the complete combustion chamber 4 to that of the flue 28 for receiving liquid waste.

The construction of this incinerator is similar to the first type except that the horizontal air passages 10 are provided in a lower position than in the first type and two arch-shaped resisting walls 37 and 38 narrow the passage of the flue 28.

When the combustion is carried on in this furnace by the induced draft, the flame in complete combustion chamber 4 will be compelled to go down guided by the wall, heating the liquid waste in cavity 36, thus evaporating and burning it.

The incinerator shown in Figs. 10 to 15 is a modification of the second type, that is, two furnaces of the same second type are combined into one. During combustion in one furnace, the garbage and solid waste contained in the other are heated to dryness. Since each furnace is alternately employed for combustion it facilitates and hastens the combustion. The furnace according to this invention consists of pre-combustion chambers 3, 3′ and complete combustion chambers 4, 4′ with cavities 36, 36′ for receiving liquid waste. The furnaces are disposed side by side communicating with each other by a vertical air duct 8′.

Operation is as follows:

After closing 10, 10′, 10″, and 5, 5′, open the damper of flue in furnace 3 where combustion is to take place, and start a draft by burning fuel on grate 33 at the rear part. Garbage and other waste are put in each pre-combustion chambers 3, and 3′, liquid waste is put into cavities 36′ and 36″, and then the transverse ducts 10″ and 10′ are opened. Under these conditions incomplete combustion gas produced in chamber 3 is introduced into the lower chamber 4 chiefly through the grate, the remainder of the gas being introduced through the chutes 8′ and 8 to chamber 4 where it undergoes complete combustion and burns the liquid waste in cavity 36, while the air sucked from 10″ and passing through 3′ can dry the garbage in chamber 3′ to some extent. If desired the hot gas may be induced into chute 8′ and chambers 3′, 4′ so that the solid waste in 3′ be completely dried, if 10 is opened instead of 10″ and the damper of 4′ is opened instead of the damper of 4. As the combustion proceeds, the contents of the chamber 3′ will ignite. Usually the damper 17 of the flue from the chamber 4′ is opened, after the combustion of garbage has taken place in chamber 3′. When the waste in chambers 3 and 4 is burnt out, 10″ is again opened, and 10 closed to repeat the above operation. As mentioned above efficiency will be improved by employing each of the furnaces alternately.

The invention is not limited to those furnaces particularly described above, but can be widely changed without departing from the spirit of this invention.

Having thus described my invention, what I claim as new and desire to secure by Letters Patent is:—

1. In an incinerator, the combination of a lower chamber for vaporizing liquid refuse, another chamber superimposed upon said first chamber, a grate separating said chambers, there being air inlets surrounding the upper and lower chambers and adapted to supply air to said chambers, said air inlet being located in the walls of said chambers, a flue connected with the lower chamber at the bottom thereof, a chimney connected with said flue, heating means located at the chimney base at the rear of the incinerator, a waste-liquor receptacle disposed in the lower chamber, said waste-liquid receptacle being located in the path of the products of combustion which finally pass into said flue.

2. In an incinerator, a lower chamber adapted for vaporizing liquid refuse, said chamber having upwardly and inwardly inclined walls, an independent cylindrical chamber superimposed upon said lower chamber and adapted for burning solid refuse, a grate separating said two chambers, there being air inlets surrounding said chambers and located in the walls thereof, a chimney, heating means located at the chimney base, a flue connecting said lower chamber to the chimney, said chimney forming exit means for the products of combustion, and a liquid-waste receptacle located in said lower chamber, said liquid-waste receptacle being located in the path of the products of combustion which finally pass into said flue.

3. In an incinerator, a lower chamber having a closed bottom for vaporizing liquid refuse, another chamber superimposed upon the same for burning solid refuse, there being valve-regulated inlets for supplying air to both chambers, said inlets being located in the wall of the incinerator, a chimney, heating means located at the chimney base at the rear of the incinerator, and a flue connecting said lower chamber to the chimney.

4. In an incinerator, a lower chamber having a closed bottom, another chamber superimposed upon the same, a grate intermediate said chambers, there being valve-controlled inlets for supplying air to both chambers, said inlets being located in the wall of the incinerator, a chimney, heating means located at the base of the chimney, and a flue connected to the chimney and also connected with the lower chamber near the bottom thereof.

5. In an incinerator, a lower chamber having a closed bottom, a second chamber superimposed upon same and divided therefrom by a grate, a charging orifice with surrounding valve-controlled air passages located in the wall of the incinerator, said orifice being at the top of said upper chamber, additional valve-controlled passages located in the wall of the incinerator for supplying air to the lower chamber, a chimney, a flue connecting said lower chamber and said chimney and heating means at the chimney base.

6. In an incinerator, the combination of a chamber having a closed bottom, a second chamber superimposed upon same and divided therefrom by a grate, a charging orifice located at the top of said upper chamber and having surrounding valve-controlled air-inlet passages located in the wall of the incinerator, said chambers respectively having outwardly and inwardly inclined wall portions, additional valve-controlled air-inlet passages located in the wall of the incinerator and leading to the lower chamber, a flue connected with the lower chamber, a chimney connected to said flue and an independent source of heat associated with the bottom of said chimney.

7. In an incinerator, a lower chamber having a closed bottom, a separate upper chamber superimposed upon said lower chamber, a grate separating the two chambers, said chambers having valve-controlled air-inlet passages located in the wall of the incinerator, there being independent orifices for supplying refuse to both chambers, a flue connected to the lower chamber and a chimney connected with said flue, and independent heating means located adjacent the chimney base.

8. In an incinerator, a lower chamber having a closed bottom, a separate upper chamber superimposed upon the lower chamber, a grate separating the two chambers, said chambers having valve-controlled air-inlet passage located in the wall of the incinerator, there being independent orifices for supplying refuse to both chambers, a flue connected to the lower chamber, a chimney connected with said flue, and an independent source of heat located adjacent the base of said chimney.

9. In an incinerator, a chamber for vaporizing liquid refuse, another chamber superimposed upon said first chamber, a grate separating said chambers, there being valve controlled passages for supplying air to said chambers, a waste liquid receptacle disposed in the lower chamber, said receptacle comprising a fire pipe in the center thereof, a passage for the products of combustion surrounding said receptacle and communicating with said fire pipe at the bottom of the said receptacle, a flue connected with said last named passage, a chimney connected with said flue whereby a down draft is induced through said incinerator.

In testimony whereof I hereto affix my signature.

ALEXANDER ALEXANDROVITCH GOLOVTCHIKOFF.